(12) United States Patent
Osaki

(10) Patent No.: US 7,139,782 B2
(45) Date of Patent: Nov. 21, 2006

(54) METHOD OF AND SYSTEM FOR TESTING REMOTE STORAGE

(75) Inventor: Nobuyuki Osaki, Campbell, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/945,824

(22) Filed: Sep. 21, 2004

(65) Prior Publication Data

US 2006/0075148 A1   Apr. 6, 2006

(51) Int. Cl.
*G06F 12/00* (2006.01)

(52) U.S. Cl. ............................ 707/204; 707/1; 707/10; 711/162

(58) Field of Classification Search .............. 707/1–10, 707/100–104.1, 200–206; 711/161–162
See application file for complete search history.

(56) References Cited

U.S. PATENT DOCUMENTS

| | | | | |
|---|---|---|---|---|
| 5,544,347 | A * | 8/1996 | Yanai et al. ................. | 711/162 |
| 5,901,327 | A * | 5/1999 | Ofek ............................. | 710/5 |
| 6,044,444 | A * | 3/2000 | Ofek ........................... | 711/162 |
| 6,052,797 | A * | 4/2000 | Ofek et al. ..................... | 714/6 |
| 6,092,066 | A | 7/2000 | Ofek | |
| 6,237,008 | B1 * | 5/2001 | Beal et al. .................. | 707/204 |
| 6,539,462 | B1 | 3/2003 | Mikkelsen et al. | |
| 6,543,001 | B1 * | 4/2003 | LeCrone et al. ............... | 714/6 |
| 6,591,351 | B1 * | 7/2003 | Urabe et al. ................. | 711/162 |
| 6,643,671 | B1 | 11/2003 | Mililo et al. | |
| 6,760,824 | B1 * | 7/2004 | Urabe et al. ................. | 711/162 |
| 6,769,054 | B1 * | 7/2004 | Sahin et al. ................. | 711/162 |
| 6,910,098 | B1 * | 6/2005 | LeCrone et al. ............. | 711/112 |
| 6,912,629 | B1 * | 6/2005 | West et al. .................. | 711/161 |
| 2003/0126107 | A1 | 7/2003 | Yamagami | |
| 2004/0260736 | A1 | 12/2004 | Kern et al. | |

OTHER PUBLICATIONS

Ryan, Julie, "Snapshots save time and data", Storage Magazine (Jun. 2002), pp. 1-4 (accessed on Jul. 3, 2004 through Internet via http://storagamagazine.techtarget.com/strg/Feature/0,291266,sid35_gci828732,00.html.
Poelker, C., "Storage Networking: SANs" in Networked Storage Info Center, SearchStorage.com, pp. 1-3 (accessed on Jul. 19, 2004 through Internet via http://searchstorage.techtarget.com/infoCenter/ask TheExpertsAnswer/0,294272,sid5_gci93).
Informational pamphlet: "HiCommand Device Manager Software", publ. by Hitachi Data System (Mar. 2004), pp. 1-4.

* cited by examiner

*Primary Examiner*—Shahid Alam
*Assistant Examiner*—Jean Bolte Fleurantin
(74) *Attorney, Agent, or Firm*—Townsend and Townsend and Crew LLP

(57) ABSTRACT

A remote backup storage system that may be tested with current backup data while the remote system continues to received data from a primary source data storage system includes a remotely located front-end volume that is connected to receive data from a source volume. A remotely located secondary volume normally receives data from the front-end volume. The secondary volume is the volume to which data of the source volume is backed up. The front-end volume serves as buffer for data transferred from the source volume to the secondary volume. A third volume that is used to preserve or restore the data in the secondary volume during a test.

23 Claims, 5 Drawing Sheets

| | 121 | 123 | 125 |
|---|---|---|---|
| | VOLUME NO. | ADDRESS | DATA TO BE WRITTEN |
| | 112 | 0001 | ... |
| | 112 | 0005 | ... |
| 127 | 112 | 0002 | ... |
| | 112 | 0004 | ... |
| | 112 | 0003 | ... |

*FIG. 7*

| 131 | 133 | 135 | 125 |
|---|---|---|---|
| SEQUENCE NO. | VOLUME NO. | ADDRESS | DATA TO BE WRITTEN |
| 010001 | 112 | 0001 | ... |
| 010002 | 112 | 0005 | ... |
| 010003 | 112 | 0001 | ... |
| 010004 | 112 | 0005 | ... |
| 010005 | 112 | 0003 | ... |

*FIG. 8*

METHOD OF AND SYSTEM FOR TESTING REMOTE STORAGE

BACKGROUND OF THE INVENTION

The present invention relates generally to the field of computer backup storage and disaster recovery systems, and more particularly to computer backup storage and disaster recovery systems in which the backup system may be tested with current backed up data while data continues to be transferred from the primary system to the backup system.

Many businesses depend heavily on their computer systems and data. Loss of data or computer production time can be disastrous to a business entity. Accordingly, most businesses back up their data. In order to achieve maximum protection, many businesses have remote sites at which their data and computer systems are duplicated. In case of a disaster or other shut down at a primary site, operations can be resumed at the remote site with substantially no loss of time or data.

When a primary volume in a production site is mirrored to a secondary volume at a remote site, system users may desire to test a disaster situation by starting applications on a host at the remote site. The test is designed to simulate taking over functionalities of the production site. The applications at the remote site may read and write data on the secondary volume for the test. The data used for the test should be as realistic as possible and preferably real data. Data mirroring from the production site to the remote site needs to be resumed as soon as possible after the test.

There have been attempts to provide systems that enable tests of disaster situations. For example, in U.S. patent Publication 2003/0126107 A1, there is disclosed a system in which a replica volume of a secondary volume is prepared and used for the test. In that system, the replica volume is an exact copy of the secondary volume. Accordingly, the replica volume is the same size as the secondary volume even though the amount of data used for the test is in all likelihood only a small part of the total amount of data in the secondary volume. Moreover, copying the entire secondary volume is a time consuming process. Additionally, some users may need to use the same volume as is used in the case of a disaster, which is not possible with the system of the U.S. publication.

An alternate attempted solution is disclosed in U.S. Pat. No. 6,092,066 in which the secondary volume is used for testing. Remote mirroring from the primary volume is suspended during the test. At the conclusion of the test, the primary and secondary volumes are resynchronized. The patented system prepares bitmaps of the primary and secondary volumes and exchanges the bitmaps in order to resynchronize the volume. If a disaster happens during the test, data written on the primary volume will be lost before it is transferred to the secondary volume. Additionally, it takes a long time to send data updated on the primary and secondary volumes during the test from the primary volume to the secondary volume until they are resynchronized with each other.

BRIEF SUMMARY OF THE INVENTION

Embodiments of the present invention provide a remote backup storage and disaster recovery system that may be tested with current backup data while the remote system continues to received data from a primary source data storage system. The system includes a remotely located front-end volume that is connected to receive data from a source volume. The system further includes a remotely located secondary volume that normally receives data from the front-end volume. The secondary volume is the volume to which data of the source volume is backed up. The front-end volume serves as buffer for data transferred from the source volume to the secondary volume. The system includes a third volume that is used to preserve or restore the data in the secondary volume during or at the conclusion of a test.

During normal operation, data received at the front-end volume is transferred substantially immediately from the front-end volume to the secondary volume. Accordingly, the secondary volume maintains a mirror of the data in the primary source volume. If it is desired to run a test of the backup storage system, command to start accepting test I/Os is issued to the storage subsystem. In response to the command to start accepting test I/Os, the front-end volume stops transferring data to the secondary volume. However, the front-end volume continues to receive data from the primary source volume; the front-end volume buffers data from the primary source volume during the test. The secondary volume contains a substantial mirror of the data in the primary source volume at the time the command to start accepting test I/Os was issued.

In one embodiment of the present invention, the system creates a snapshot of the secondary volume in response to the command to start accepting test I/Os. The system stores the snapshot on the third volume. The system uses the well known "copy on write" snapshot methodology. The storage system services both test read and write requests with the secondary volume. However, when the storage system receives a write request, the system first determines if the record to be written is in the snapshot volume. If not, the system copies the record to be written from the secondary volume to the snapshot volume. Then, the system writes the record received with the write request in the secondary volume. If the record to be written is already in the snapshot volume, the system simply writes the record in the secondary volume. When the secondary storage system receives a command to stop accepting test I/Os, the system uses the snapshot to restore the data in the secondary volume to the state that existed at the time of the command to start accepting test I/Os. Then the data buffered in the front-end volume is transferred to the secondary volume. The transferred buffered data updates or synchronizes the data in the secondary volume with the data in the primary source volume.

In an alternative embodiment, the system of the present invention uses the secondary volume and the third volume to service test I/Os from the secondary host computer. When the system receives a write request, the system writes the record received with the request in the third volume. When the system receives a read request, the system first determines if the requested record is in the third volume. If so, the system returns the requested record from the third volume. If not, the system returns the requested record from the secondary volume. Thus, in the alternative embodiment, data in the secondary volume does not change during the test. All data written by the secondary host computer is in the third volume. When the system receives a command to stop accepting test I/Os, data buffered in the front-end volume is transferred to the secondary volume and the records in the third volume may be discarded.

BRIEF DESCRIPTION OF THE DRAWINGS

FIG. 7 is a table illustrating one format for data in a front-end volume according to an embodiment of the present invention.

FIG. 8 is a table illustrating an alternative format for data in a front-end volume according to an embodiment of the present invention.

DETAILED DESCRIPTION OF THE INVENTION

Figure 1:
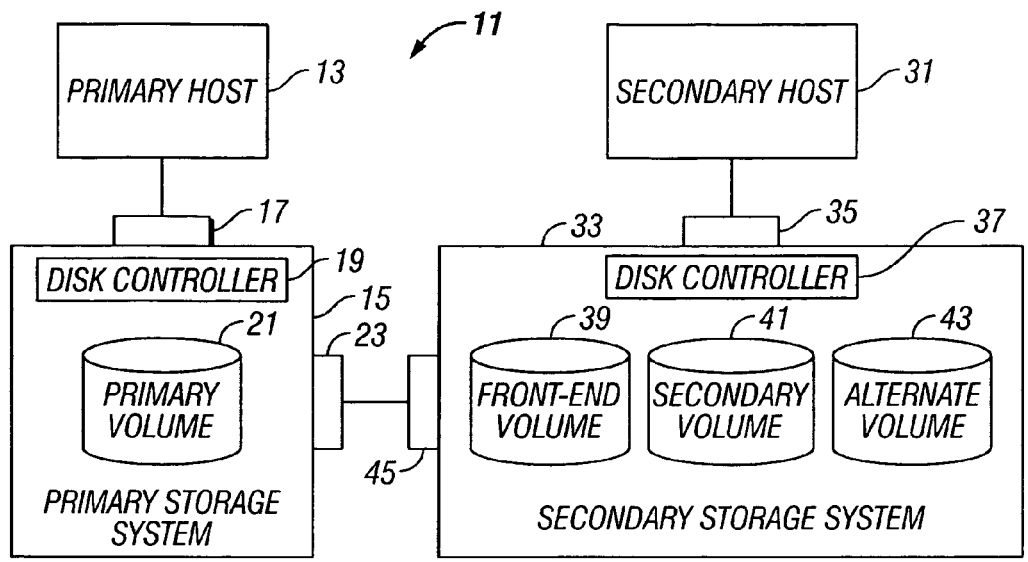
FIG. 1 is a block diagram of a system according to an embodiment of the present invention.

Referring now to the drawings, and first to FIG. 1, a computer system is designated generally by the numeral 11. The computer system 11 includes a primary host 13 and a primary storage system 15. Host 13 and storage system 15 may be located at a production location. Primary storage system 15 includes a host interface 17, at least one disc controller 19 and multiple primary physical or logical data volumes 21. Host interface 17 accepts input/output (I/O) requests from primary host 13. Disc controller 19 routes the I/O requests to the appropriate volume 21.

System 11 also includes a secondary host 31 and a secondary storage system 33, preferably located at a remote site. Secondary storage system 33 is similar to primary storage system 15 in that it includes a host interface 35, and a disc controller 37. Secondary storage system 33 includes at least three physical or logical volumes, including a first or front-end volume 39, a secondary volume 41 and an alternate volume 43. As will be explained in detail hereinafter, front-end volume 39 serves as buffer between primary volume 21 and secondary volume 41. During normal operations, secondary volume 41 is a mirror of primary volume 21. During normal operations, alternate volume 43 may be substantially empty or it may not exist; alternate volume 43 may be created in connection with a test. During a test, alternate volume 43 is used to maintain or restore the contents of secondary volume 41.

Primary storage system 15 includes a remote copy interface 23. Similarly, secondary storage system 33 includes a remote copy interface 45. Remote copy interfaces 23 and 45 are interconnected by a suitable data communications link.

Figure 2:
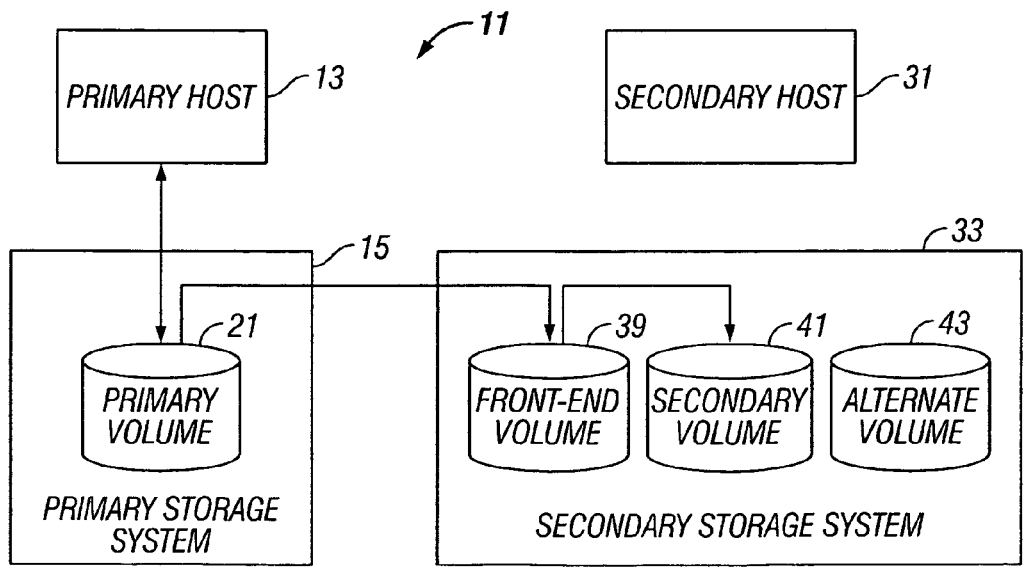
FIG. 2 is a block diagram illustrating the normal flow of data according to one embodiment the present invention.

Referring now to FIG. 2, there is shown the flow of data during normal operation of system 11. Data flows back and forth between primary host 13 and primary volume 21 during normal I/O operations. At the same time, data on primary volume 21 is copied to front-end volume 39 of secondary storage system 33. Also at the same time, data is copied from the front-end of volume 39 to secondary volume 41. Front-end volume 41 serves effectively as a buffer for data transferred between primary volume 21 and secondary volume 41. When data is transferred from front-end volume 39 to secondary volume 41, a copy of the data is not retained in front-end volume 39. Accordingly, front-end volume 39 may be of a relatively small capacity.

Figure 3:
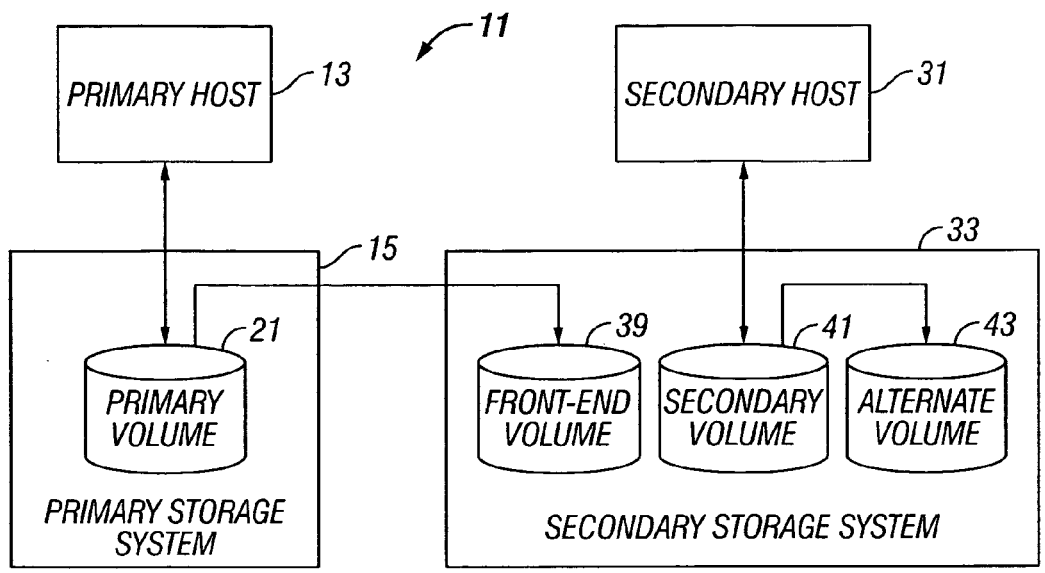
FIG. 3 is a block diagram illustrating the flow of data in a test situation according to one embodiment of the present invention.

Referring now to FIG. 3, there is illustrated the flow of data in a test situation according to one embodiment of the present invention. The system operates in the normal condition, illustrated in and described with respect to FIG. 2 until it receives a command to start accepting test I/Os. The command to start accepting test I/Os may be issued by secondary host 31, or by a management server (not shown), or other entity. In response to the command to start accepting test I/Os, the system stops transferring data between front-end volume 39 and secondary volume 41. However, front-end volume 39 continues to receive data from primary volume 21. Accordingly, front-end volume 39 will contain a copy of all data transferred from primary volume 21 during the test. Also in response to the command to start accepting I/Os, the system of this embodiment of the present invention creates a snapshot of secondary volume 41 and stores the snapshot on alternate volume 43. As is well known to those skilled in the art, a snapshot volume is a logical volume that does not necessarily contain actual data if there is no change of the data in secondary volume 41. Accordingly, the snapshot volume can be of relatively small capacity, i.e. large enough for the snapshot image and the originals of any data records updated during the test. After creating the snapshot, data is passed back and forth between secondary host 31 and secondary volume 41 by means of I/O requests. The system of this embodiment of the present invention preferably implements the well-known copy on write snapshot methodology, which will be explained in detail hereinafter. At the conclusion of the test, which is signaled by a stop accepting test I/Os command, the system according to this embodiment of the present invention uses conventional snapshot methodology to restore secondary volume 41 to the state that existed at the time the test began. Then, data buffered in front-end volume 39 is transferred to secondary volume 41 and normal operations resume. The snapshot and any data in alternate volume 43 may be cleared at the conclusion of the test.

Figure 4:
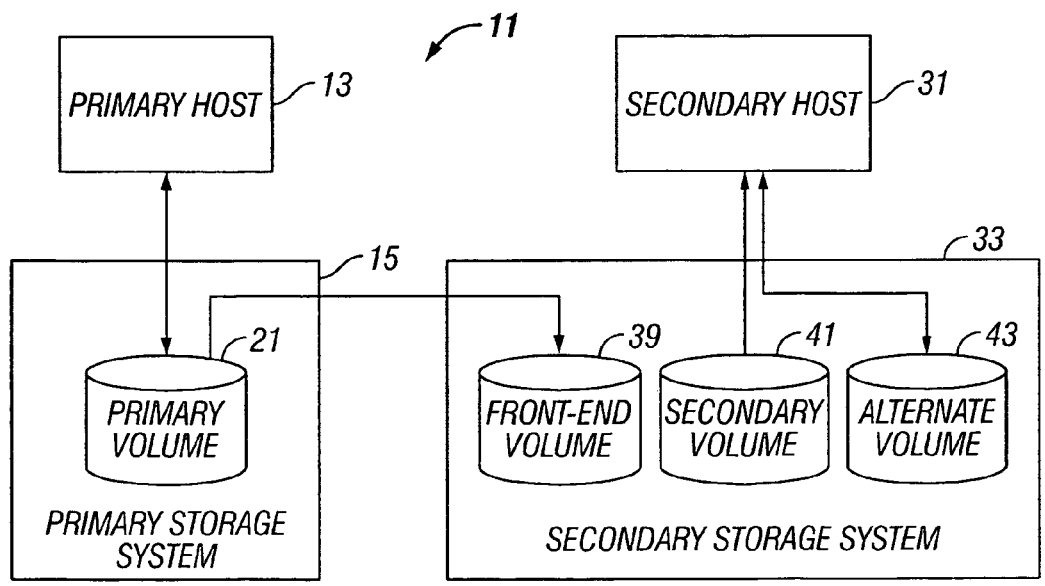
FIG. 4 is a block diagram illustrating the flow of data in a test situation according to a second embodiment of the present invention.

Referring now to FIG. 4, there is illustrated the flow of data in an alternative embodiment of the present invention. The embodiment of FIG. 4 is similar to the embodiment at FIG. 3 in that in response to a command to start accepting test I/Os, data transfer between front-end volume 39 and secondary volume 41 is suspended, while data continues to be transferred from primary volume 21 to front-end volume 39. Secondary volume 41 and alternate volume 43 work together to service I/O requests from secondary host 31. In the embodiment of FIG. 4, all write requests are written to alternate volume 43 rather than secondary volume 41. Read requests are serviced either by the secondary volume 41 or alternate volume 43. If the requested record is in alternate volume 43, then the requested record is read from the alternate volume 43; otherwise, the requested record is read from secondary volume 41. Thus, the first time a data record is requested by secondary host 31, the data is read from secondary volume 41. If that data record is written back to secondary storage system 33, the record is written on alternate volume 43. Accordingly, the data in secondary volume 41 never changes during the test. Since alternate volume contains only data records that have been written back to secondary storage during the test, it may be of relatively small capacity. At the conclusion of the test, indicated by a stop accepting test I/O command, data in front-end volume 39 is transferred to secondary volume 41 and normal operations resume. Any data in alternate volume 43 may be cleared.

Figure 5:
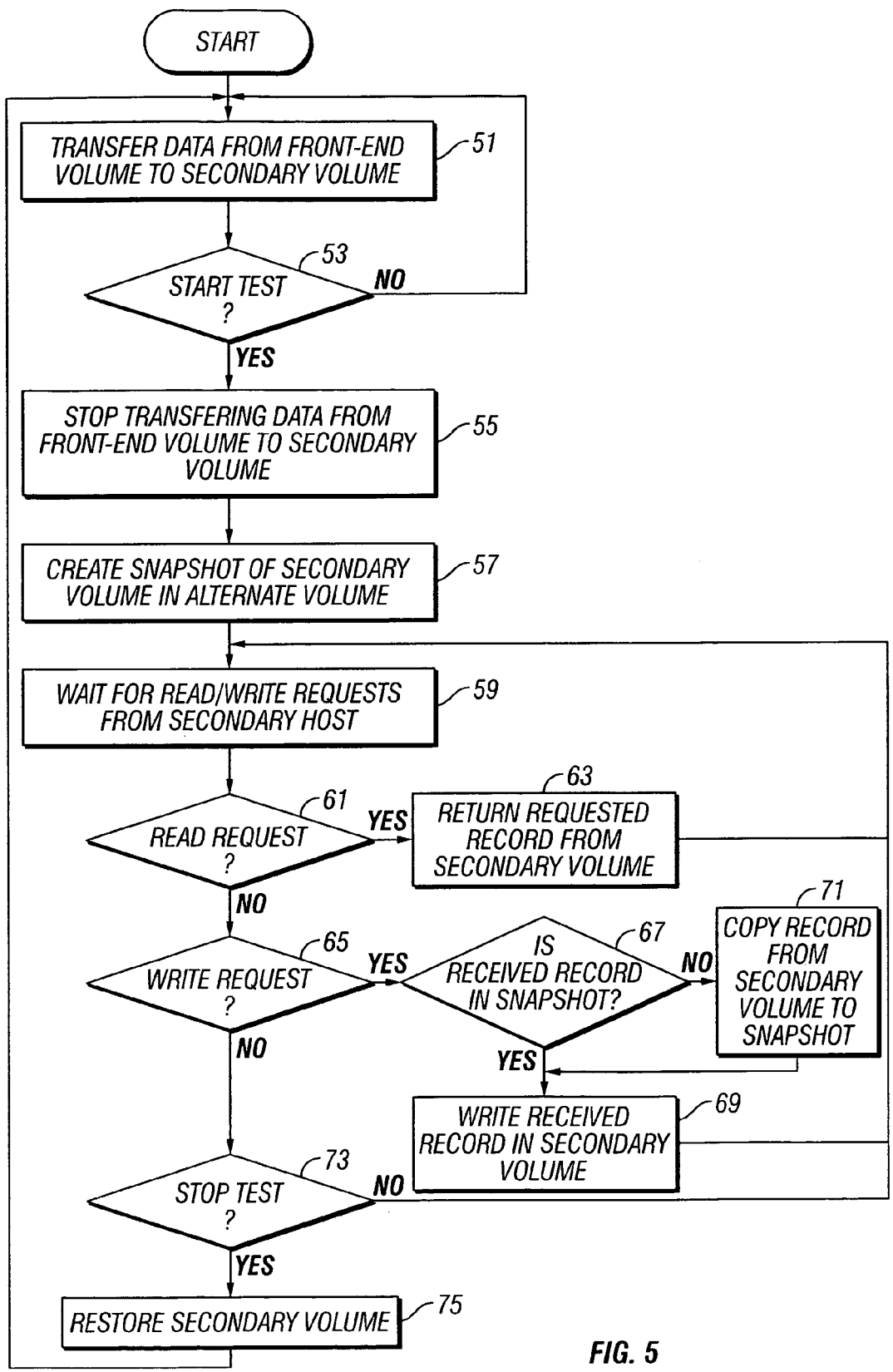
FIG. 5 is a flowchart of one embodiment of the present invention.

Referring now to FIG. 5, there is illustrated a flow chart of the embodiment of FIG. 3. During normal operations, data is transferred from the front-end volume to the secondary volume as indicated at block 51. Data continues to be transferred from the front-end volume to the secondary volume until, as determined at decision block 53, the system receives a start test command. In response to the start test command, the system stops transferring data from the front-end volume to the secondary volume as indicated at block 55. Then, the system creates a snapshot of the secondary volume and places the snapshot in the alternate volume, as indicated at block 57. Then, the system waits for read/write requests from the secondary host, as indicated at block 59. If, as determined at decision block 61, the system receives a read request, the system returns the requested record from the secondary volume, as indicated at block 63, and processing returns to block 59. If, as determined at decision block 55, the system receives a write request, the system tests, at decision block 57 if the received record is in the snapshot volume. If so, the system writes the received record to the secondary volume, as indicated at block 69. If the received record is not in the snapshot volume, then the system copies the original record to be written from the secondary volume to the snapshot volume at block 71 and then writes the received record in the secondary volume at block 69. Then, the system returns to block 59 to wait for more read/write requests from the secondary hosts. Test I/O processing continues until the system receives a stop test command, as determined at decision block 73. In response to a stop test command, the system restores the secondary volume, as indicated at block 75, using the snapshot, and processing returns to block 51.

Figure 6:
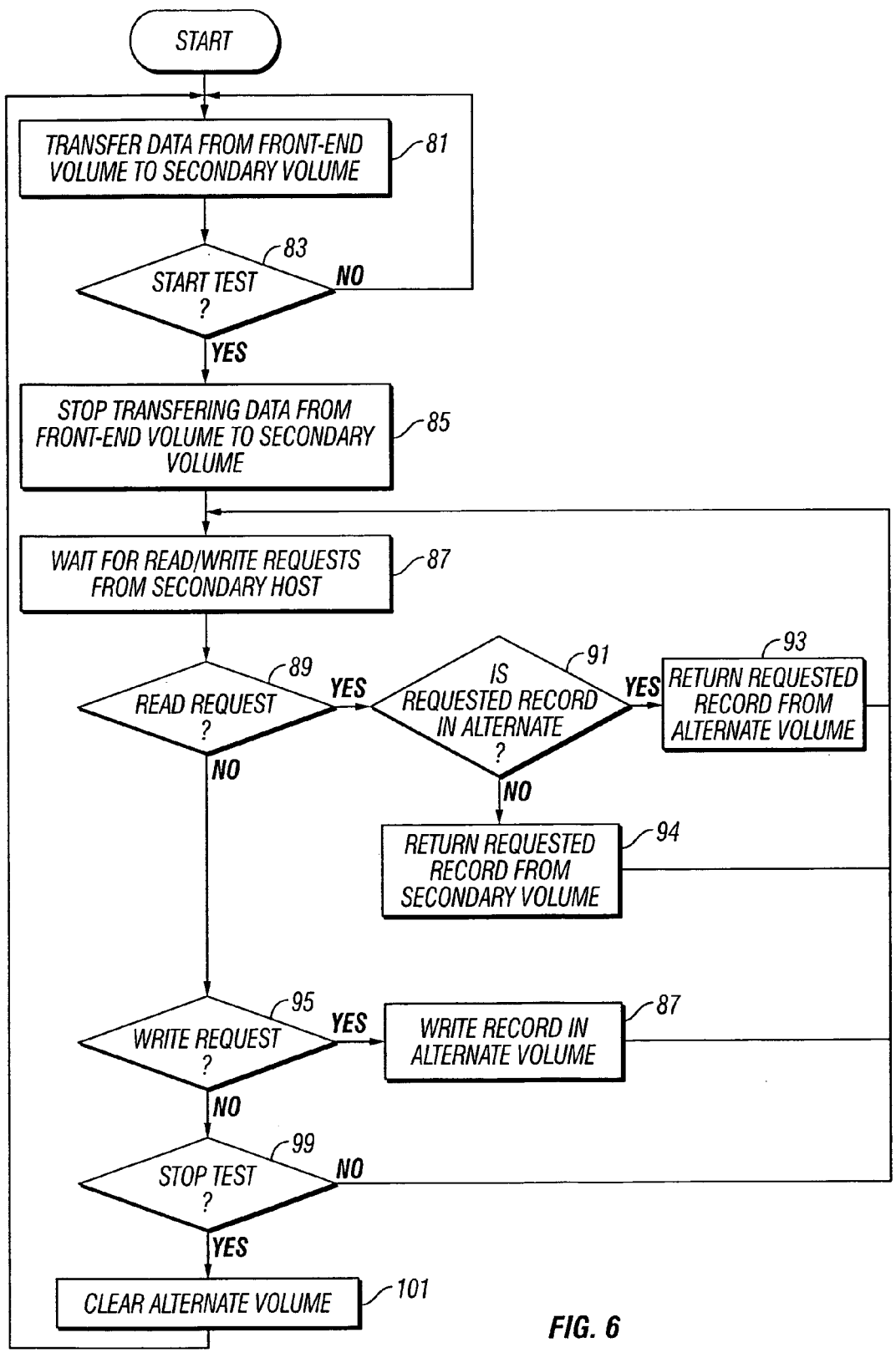
FIG. 6 is a flowchart of a second embodiment of the present invention.

Referring now to FIG. 6, there is illustrated a flow chart of the FIG. 4 embodiment of the present invention. As indicated at block 81, data is transferred from the front-end volume to the secondary volume until, as determined at decision block 83, until the system receives a command to start accepting test I/O. In response to the command to start accepting test I/O, the system stops transferring data from the front-end volume to the secondary volume, as indicated at block 85. The system then waits for read/write requests from the secondary host, as indicated at block 87. If, as determined at decision block 89, the system receives a read request, the system determines, as indicated at decision block 91 if the requested record is in the alternate volume. If so, the system returns the requested record from the alternate volume, as indicated at block 93 and processing returns to block 87. If the requested record is not in the alternate volume, then the system returns the requested record from the secondary volume, as indicated at block 94 and processing returns to block 87. If, as indicated at decision block 95, the system receives a write request, the system writes the record of the request in the alternate volume, as indicated at block 97, and processing returns to block 87. Test I/O processing continues until the system receives a stop test command, as indicated at decision block 99. In response to a stop test command, the system clears the alternate volume, as indicated at block 101, and processing returns to block 81 where, all data buffered in the front-end volume is transferred to the secondary volume.

Referring now to FIGS. 7 and 8, there are illustrated alternative formats for data buffered in front-end volume 39 or stored in alternate volume 43. Referring first to FIG. 7, the identity of the secondary volume to which the data is to be written is indicated in a volume column 121. The address of the data to be written in the secondary volume is indicated in an address column 123. The data to be written is in a data column 125. The data records are stored in the various lines of the table of FIG. 7. In order to transfer data from the front-end volume to a secondary volume 121, a record is selected from the table of FIG. 7 and the data in column 125 is written at the address specified in column 123. For example, in line 127 of FIG. 7, data is written at address location 0002 of volume number 112. After copying the data record, the data record is removed from the front-end volume. If a new record is received at the front-end volume and there is another record with the same volume ID and address, the data of the new record is overwritten on the previous record.

Referring now to FIG. 8, there is illustrated an alternative data format for the data in the front-end volume or the alternate volume. The table of FIG. 8 includes a sequence number column 131, a volume number column 133, an address column 135, and a data to be written column 125. The sequence number column 131 indicates the order in which each data record is received. Data records are not overwritten in the embodiment of FIG. 8. Rather, they are simply stored the order in which they are received. When moving data from the front-end volume to the secondary volume, the disc controller looks for the record having the next sequential number from the last moved data record. The disc controller copies the next sequential record to the specified address in the specified secondary volume and removes the record from the front-end volume. When this format is used, the most current record with the same address of the requested record in the alternate volume is returned in step 93 in FIG. 6.

From the foregoing it may be seen that the method and system according to embodiments of the present invention overcome the shortcomings of the prior art. The alternate volume according to embodiments of the present invention may be of small capacity rather than large enough to contain a complete copy of the secondary volume, as in the prior art. In one embodiment of the present invention, the secondary volume may be resynchronized with the primary volume quickly at the end of a test using a snapshot and the data buffered in the front-end volume, rather than the tedious process of comparing bit maps. In an alternative embodiment, the data in the secondary volume never changes during the test, so the secondary volume is synchronized with the primary volume simply by resuming normal operations. Additionally, data copying from the primary storage system to the secondary system is not suspended during a test. Accordingly, there will be no loss of data in case of a disaster situation occurring during a test.

The invention claimed is:

1. A storage system, which comprises:
   a first volume connected to receive data from a source volume;
   a second volume;
   means for transferring data from said first volume to said second volume;
   means for suspending transfer of data from said first volume to said second volume in response to instructions to accept test I/O requests;
   means for servicing, with said second volume, test I/O requests from a secondary host computer to test I/O between said second volume and said secondary host computer during suspension of transfer of data from said first volume to said second volume; and,
   means for resuming transfer of data from said first volume to said second volume in response to instructions to stop accepting test I/O requests;

wherein said means for servicing test I/O requests includes a third volume;

wherein said source volume is a primary volume of a primary storage system, said first volume is a front-end volume of a secondary storage system, said second volume is a secondary volume of said secondary storage system, and said third volume is an alternate volume of said secondary storage system.

2. The system as claimed in claim 1, including:
means for creating in said third volume a snapshot of said second volume in response to said instructions to accept test I/O requests.

3. The system as claimed in claim 2, including:
means for servicing with said second volume read requests.

4. The system as claimed in claim 2, including:
means for servicing from said second volume write requests.

5. The system as claimed in claim 4, including:
means for determining if a record to be written is in said snapshot.

6. The system as claimed in claim 2 including:
means for restoring said second volume in response to instructions to stop accepting test I/O requests.

7. The system as claimed in claim 1, including:
means for servicing write requests with said third volume.

8. The system as claimed in claim 7, including:
means for determining if record subject to a read request is in said third volume.

9. The system as claimed in claim 8, including:
means for servicing said read request from said third volume if the record to be read is in said third volume.

10. The system as claimed in claim 8, including:
means for servicing said read request from said second volume if the record to be read is not in said third volume.

11. The system as claimed in claim 1, including:
means for clearing said third volume in response to said instructions to stop accepting test I/O requests.

12. The system as claimed in claim 1, wherein said source volume is a primary volume of a primary storage system, said first volume is a front-end volume of a secondary storage system, and said second volume is a secondary volume of said secondary storage system.

13. The system as claimed in claim 12, further comprising means for continuing transferring data from said source volume to said first volume during suspension of transfer of data from said first volume to said second volume.

14. A method of providing backup services, which comprises:
receiving data from a source volume at a remotely located first volume;
transferring data from said first volume to a remotely located second volume;
suspending transfer of data from said first volume to said second volume in response to instructions to accept test I/O requests;
servicing, with said second volume, test I/O requests from a secondary host system to test I/O between said second volume and said secondary host system during suspension of transfer of data from said first volume to said second volume,
resuming transfer of data from first volume to said second volume in response to instructions to stop accepting test I/O requests; and
creating a snapshot of said second volume in response to said instructions to accept test I/O requests;
wherein said source volume is a primary volume of a primary storage system, said first volume is a front-end volume of a secondary storage system, said second volume is a secondary volume of said secondary storage system, and said third volume is an alternate volume of said secondary storage system.

15. The method as claimed in claim 14, wherein servicing test I/O requests with said second volume includes:
accepting test read and test write requests.

16. The method as claimed in claim 15, including:
prior to servicing a write request, determining if the record to be written is in said snapshot;
if said record to be written is not in said snapshot, copying said record to be written from said second volume to said snapshot before writing said record to be written in said second volume.

17. The method as claimed in claim 14, including:
restoring said second volume with said snapshot in response to said instructions to stop accepting test I/O requests.

18. The method as claimed in claim 17, including clearing said snapshot after restoring said second volume.

19. The method as claimed in claim 14, including:
in response to a test write request from said secondary host system, writing a record in an alternate volume.

20. The method as claimed in claim 19, including:
in response to a test read request form said secondary host system, determining if the record to be read is in said alternate volume;
reading the record to be read from said alternate volume if said record to be read is in said alternate volume; and,
reading the record to be read from said second volume if said record to be read is not in said alternate volume.

21. The method as claimed in claim 20, including:
clearing said alternate volume in response to instructions to stop accepting test I/O requests.

22. The method as claimed in claim 14, wherein said source volume is a primary volume of a primary storage system, said first volume is a front-end volume of a secondary storage system, and said second volume is a secondary volume of said secondary storage system.

23. The method as claimed in claim 22, further comprising continuing transferring data from said source volume to said first volume during suspension of transfer of data from said first volume to said second volume.

* * * * *